US008851760B1

(12) United States Patent
Monaweck

(10) Patent No.: US 8,851,760 B1
(45) Date of Patent: Oct. 7, 2014

(54) BEARING QUICK RELEASER

(71) Applicant: James E. Monaweck, Marshall, MI (US)

(72) Inventor: James E. Monaweck, Marshall, MI (US)

(*) Notice: Subject to any disclaimer, the term of this patent is extended or adjusted under 35 U.S.C. 154(b) by 0 days.

(21) Appl. No.: 13/668,219

(22) Filed: Jan. 29, 2013

(51) Int. Cl.
*F16C 35/06* (2006.01)
*F16C 19/04* (2006.01)
*F16C 33/30* (2006.01)

(52) U.S. Cl.
CPC ............... *F16C 19/04* (2013.01); *F16C 33/30* (2013.01)
USPC .......................... 384/537; 384/539; 384/428

(58) Field of Classification Search
USPC ................ 384/537–542, 546, 584–588, 428; 403/109.2, 109.3, 318, 319
See application file for complete search history.

(56) References Cited

U.S. PATENT DOCUMENTS

| | | | | |
|---|---|---|---|---|
| 1,893,574 | A * | 1/1933 | Anderson | 384/546 |
| 2,744,801 | A * | 5/1956 | Granberry et al. | 403/318 |
| 4,691,818 | A * | 9/1987 | Weber | 403/318 |
| 5,452,381 | A * | 9/1995 | Guerra | 384/545 |
| 6,708,786 | B2 * | 3/2004 | Cariveau et al. | 384/95 |
| 2008/0212910 | A1 * | 9/2008 | Crooks | 384/440 |

* cited by examiner

*Primary Examiner* — Thomas R. Hannon
(74) *Attorney, Agent, or Firm* — Ronald R. Kilponen

(57) ABSTRACT

A bearing block can be secured to a fixture with quick release spring pins. The bearing block can also be secured to a shaft using a quick release spring pin. This facilitates the removal of the bearing block for repair or for cleaning whereby the bearing block can be removed without the necessity of tools or skilled labor. This thereby saves time in the removal, cleaning and reassembly or replacement of the bearing block and the device can be put back into service with significant time savings. This bearing block can be used in new designs or can be used to retrofit existing bearings and blocks.

9 Claims, 6 Drawing Sheets

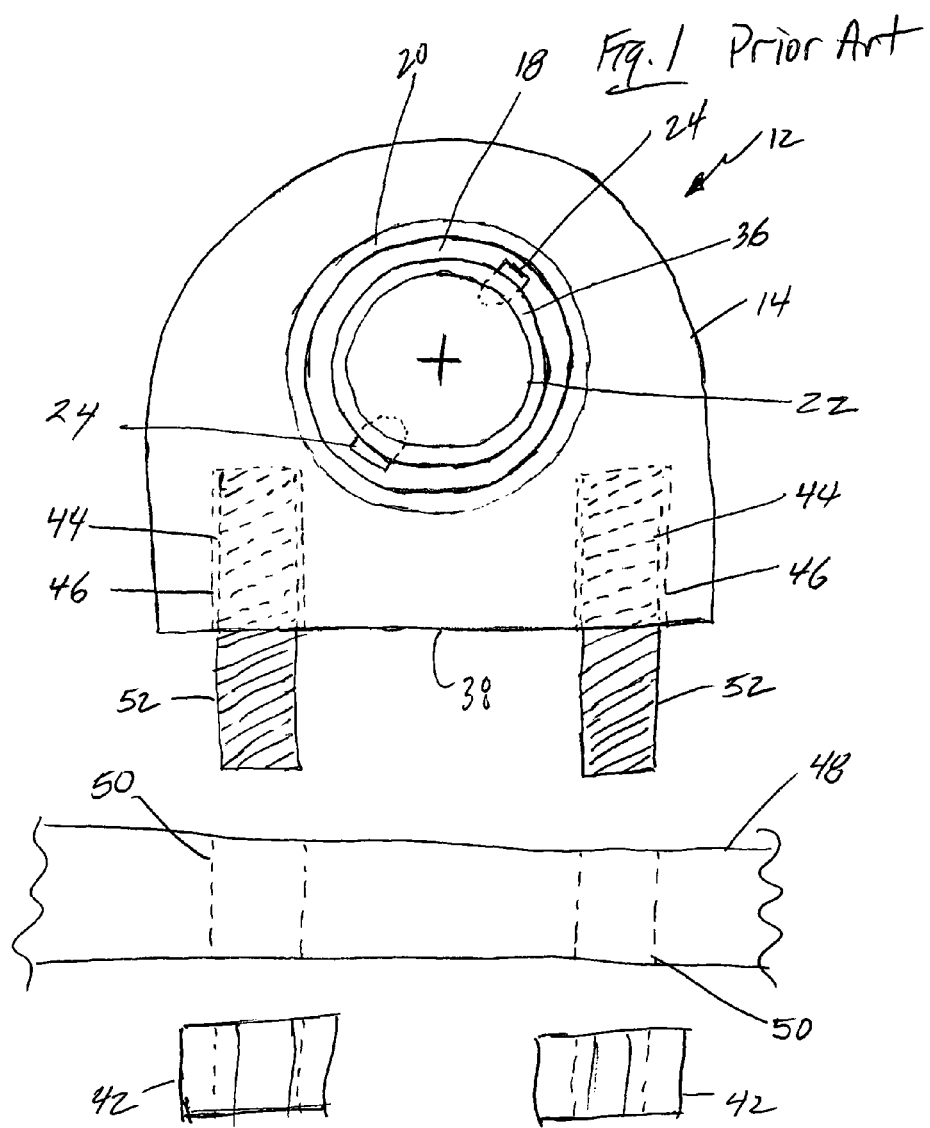

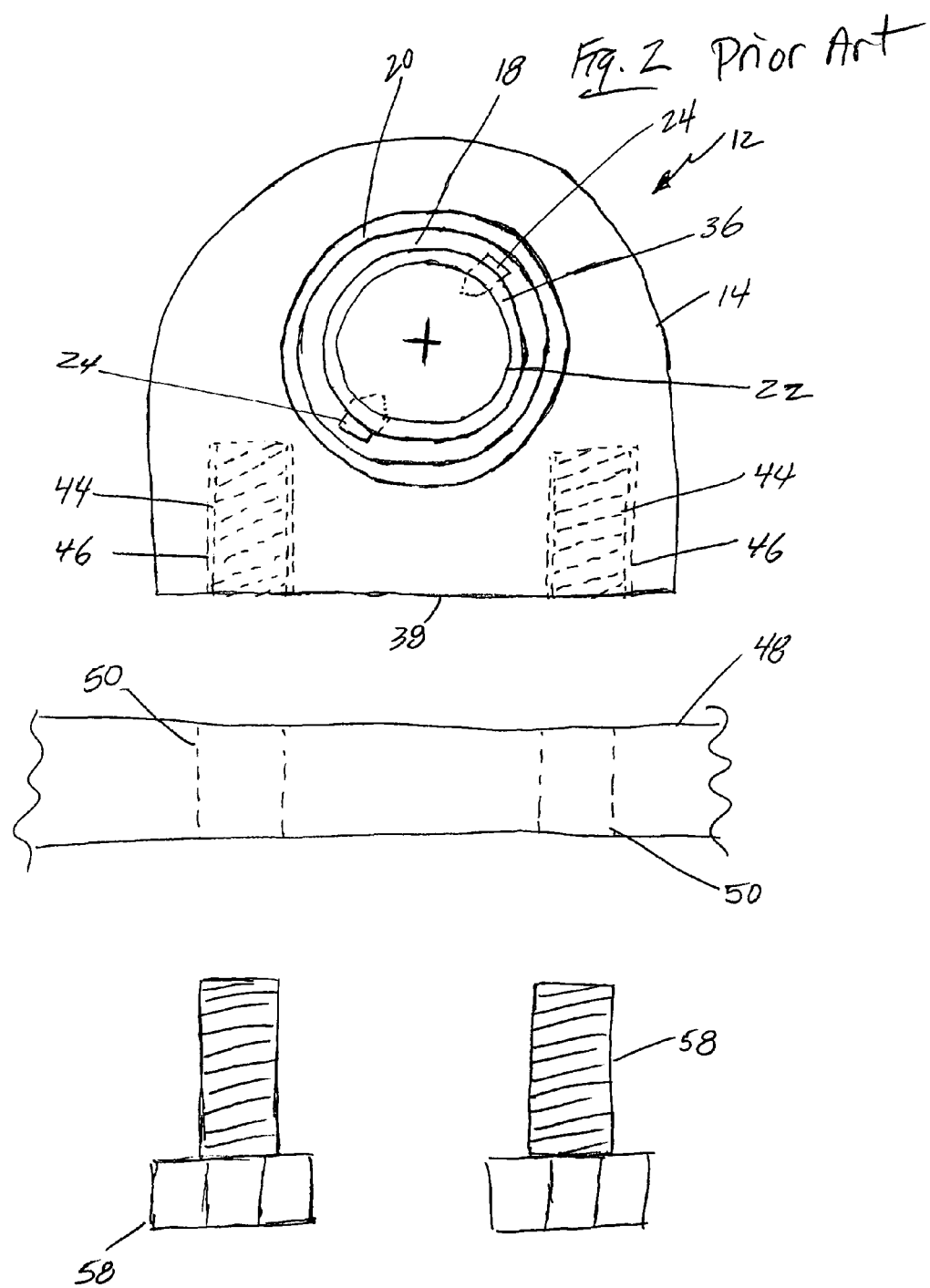

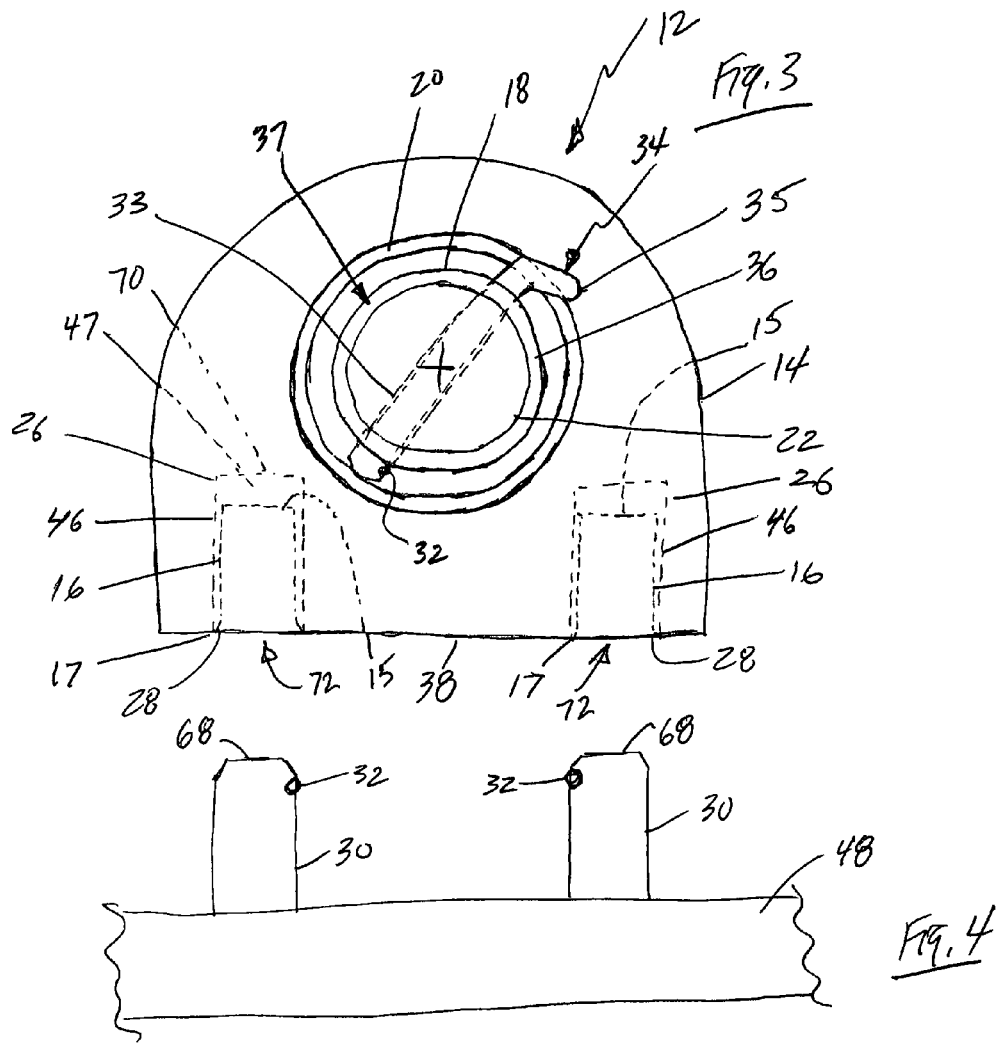
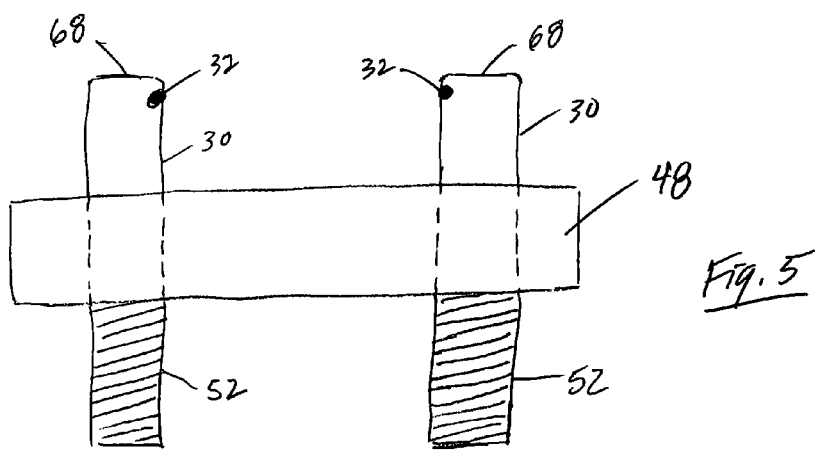

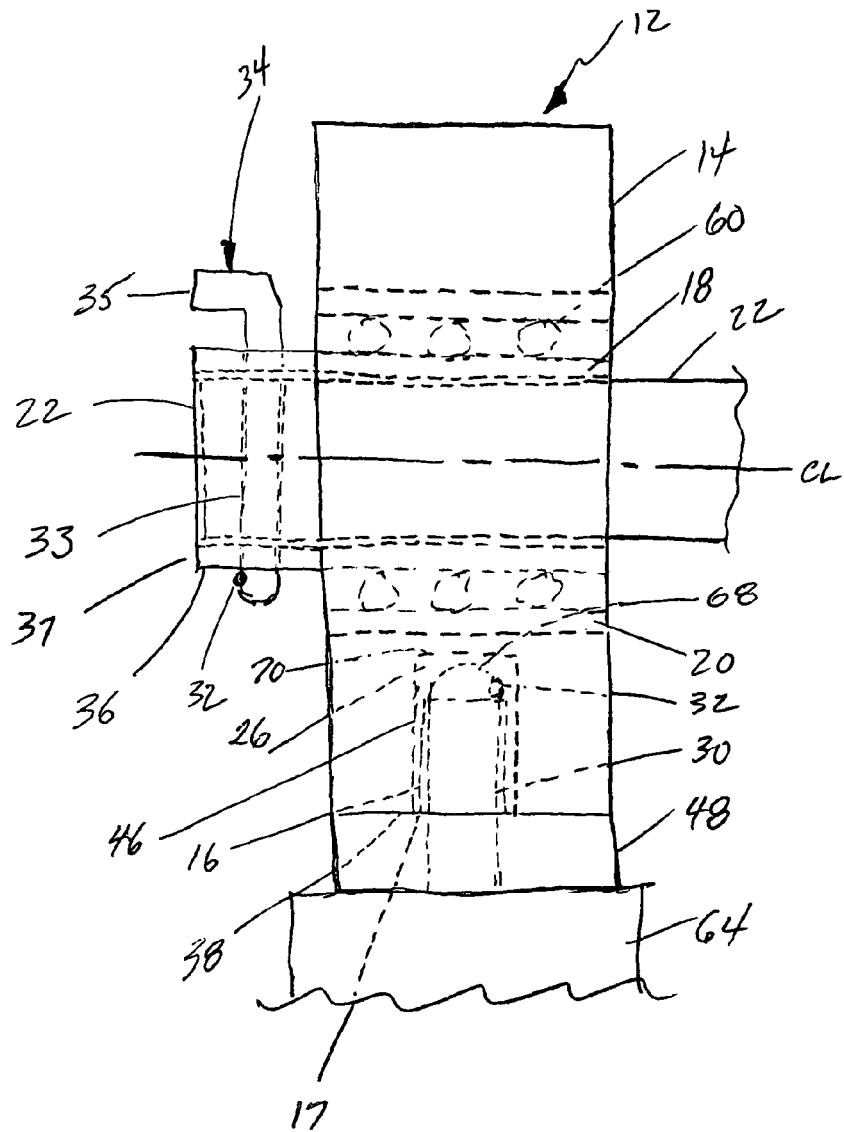

BEARING QUICK RELEASER

FIELD

The present versions of these embodiments relate generally to the field of quick releases for bearing blocks that are used primarily in the food, dairy, pharmaceutical, meat and poultry processing industries.

BACKGROUND

These embodiments relate to quick release bearings, and more particularly to bearings that can be released quickly and easily to reconfigure, manufacture, maintain, disassemble, sanitize, reassemble a processing conveyor line or for cleaning of the line.

Conveyors are used to transport raw materials for processing and used to transport the packaged goods when processing is complete. Many times the product being transported spills, drips, food particulate sticks, and dust from food collects on the conveyors. The conveyors and related equipment must be cleaned and sanitized to maintain food safety and comply with good food manufacturing practices and cleanliness requirements. When product or lines change many times the conveyors and related processing equipment must be cleaned before the new product is run to prevent contamination of a first product with the second product. In industries where the product being processed or transported is liquid or not a dry ingredient, the lines must be cleaned every so many hours or days dependent upon the industry, materials or state and federal requirements.

Cleaning the lines and processing equipment many times means that the lines or conveyors must be completely disassembled and cleaned with a disinfectant or other cleaner.

Conveyors use bearings to transport the materials on the conveyor belts. Traditionally the bearings are mounted into blocks and the blocks are bolted or welded to a fixed point on the conveyor. A shaft rotates in the bearing blocks and this allows the conveyor to move the product, raw materials and packaged goods.

When the lines need to be maintained, changed or cleaned, one must remove the bearings and bearing blocks and clean any surfaces between the bearing blocks and their attachment points. This requires the use of tools and a mechanic and can be very time consuming to disassemble the bearings and blocks from the conveyor lines. Once the bearings and blocks are disassembled, they must then be cleaned or replaced according to the correct protocol, and then reassembled to get the conveyor line running again. This reassembly also requires tools and a mechanic which can be costly and time consuming. Since the conveyor lines only make money when they are running, any time savings in this maintenance and cleaning process allows more productivity and makes the equipment more productive.

Some times bearings will fail, and the conveyor line will not run or will not run safely. When this occurs the bearing must then be removed and replaced with a new bearing. Again a mechanic and tools are needed and this process can be costly and time consuming.

Traditional bearings and blocks are commonly affixed with bolts or have threaded rods to which are attached nuts to retain the bearings and blocks to the fixture or conveyor line.

It would greatly aid the food processing industry and other industries if a line could be stripped down or a failed bearing could be changed both quickly and easily without the need for a mechanic or tools.

For the foregoing reasons, there is a need for a bearing quick release block.

SUMMARY

In view of the foregoing disadvantages inherent in the bearings used in the traditional food processing industry and other industries there is a need for a bearing quick release block that could be disassembled without the need for tools. There is a need for both the replacement of a failed bearing and the disassembly of a bearing from a conveyor for cleaning and maintenance that does not require the use of tools or skilled labor.

A first objective of these embodiments is to provide a bearing and a mount block that can replace the traditional bearing and block that affix to conveyors and other processing equipment without the need for extensive modifications.

Another objective of these embodiments is to provide a bearing and a mount block that can replace the traditional bearing and block that can be removed without the need for tools.

Another objective of these embodiments is to provide a bearing block that can replace the traditional bearing and block, that can be removed or replaced without the need for skilled labor.

It is yet another objective of these embodiments to provide a bearing and a mount block that can expedite the removal of conveyor components for cleaning and/or maintenance so that the line can be cleaned and/or maintained, reassembled and running again quickly.

These together with other objectives of these embodiments, along with various features of novelty which characterize these embodiments, are pointed out with particularity in the claims annexed hereto and forming a part of this disclosure. For a better understanding of these embodiments, the operating advantages and the specific objectives attained by its uses, reference should be had to the accompanying drawings, descriptive matter and claims in which there is illustrated a preferred embodiment.

BRIEF DESCRIPTION OF DRAWINGS

FIG. 1 shows a side view of one embodiment of the background art.

FIG. 2 shows a side view of another embodiment of the background art.

FIG. 3 shows a side view of one embodiment of the bearing block quick release.

FIG. 4 shows a side view of one embodiment of the spring pins in a mount surface.

FIG. 5 shows a side view of another embodiment of the spring pins in a mount surface.

FIG. 6 shows an edge view of one embodiment of the bearing block quick release attached to a fixture.

DETAILED DESCRIPTION OF THE PREFERRED EMBODIMENTS

Figure 7:
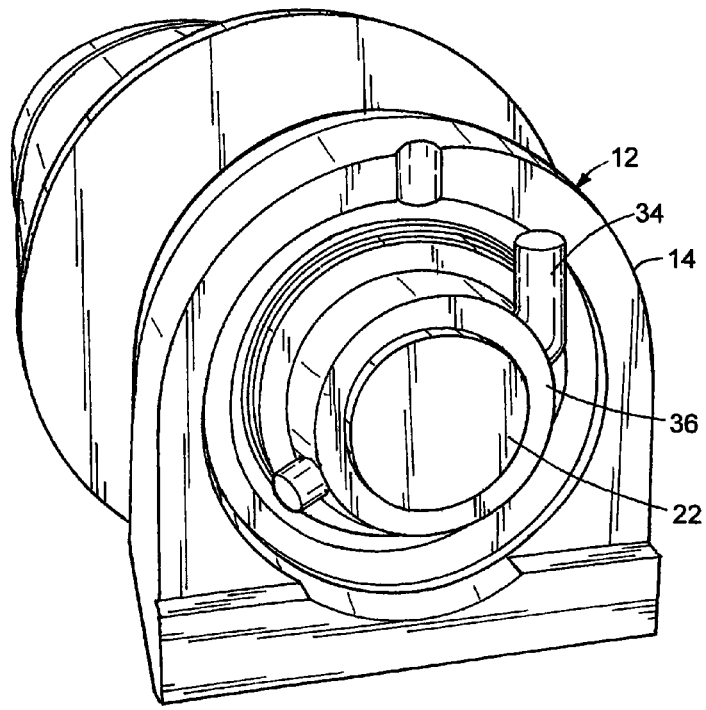
FIG. 7 shows a side view of one embodiment of the bearing block quick release partially assembled.
Figure 8:
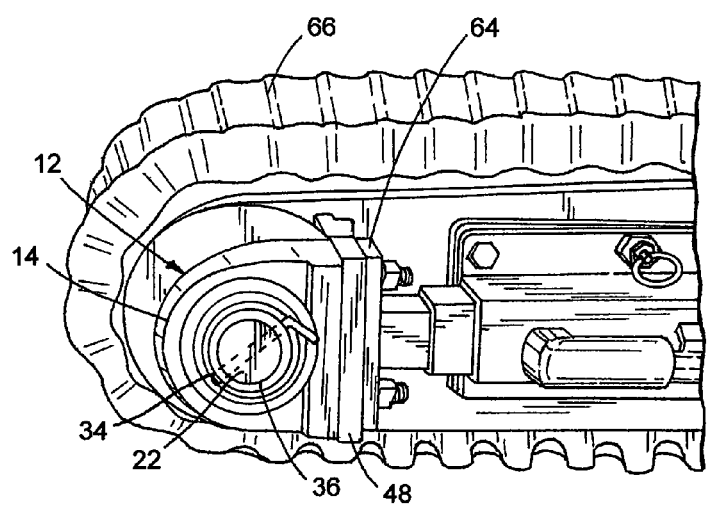
FIG. 8 shows one embodiment of the bearing block quick release attached to a fixture and a conveyor.
Figure 9:
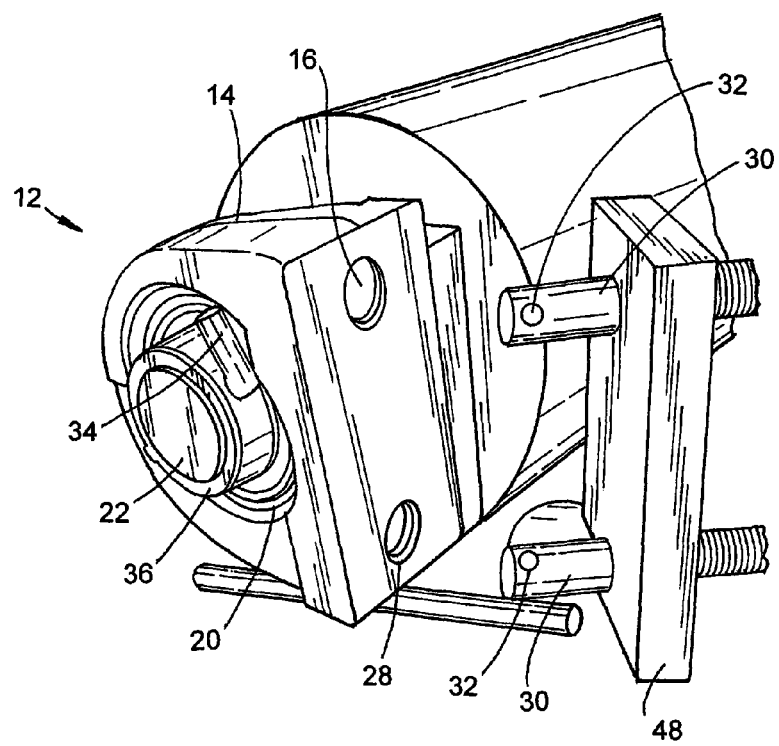
FIG. 9 shows one embodiment of the bearing block quick release partially assembled.

Referring to the drawings in detail wherein like elements are indicated by like numerals, there is shown in FIG. 1 a background bearing block 12. The bearing block 12 has a mount block 14 into which is affixed an inner race 18 an outer race 20 with balls 60 in between, FIG. 6. The inner race 18 has a shoulder 36 which extends from the outer surface of the bearing block 12, best seen FIG. 6. The shaft 22 extends from the bearing block 12 and terminates near the end of the shoulder 36, FIG. 6. FIG. 1 shows a pair of set screws 24 that are threaded into the shoulder 36 and into the shaft 22 to retain the shaft 22 fixed to the shoulder 36 of the inner race 18. The balls 60 allow the shaft 22 to spin relative to the mount block 14. The mount block 14 has a surface 38. Into the surface 38 are drilled block holes 46. The block holes 46 then typically have a threaded insert 44 lodged into the block holes 46. The threaded inserts 44 can be pressed into the block holes 46, be molded into the mount block 14 or be secured with adhesives.

Threaded studs 52 are then inserted into the block holes 46. The threaded studs 52 are then inserted through the mount holes 50 in the mount surface 48 which is typically secured to the mechanical structure. Nuts 42 then secure the surface 38 of the mount block 14 to the mount surface 48. This thereby secures the shaft 22 to the mechanical structure and for example and not by limitation, a conveyor belt can be looped over the shaft 22 to provide a method of transporting materials and finished products.

In the background embodiment of FIG. 1, one can appreciate that to remove the bearing block 12 in the event of failure or necessary cleaning, one must first remove the set screws 24 (and make sure that they don't get lost). Next one must remove the nuts 42 and then the bearing block 12 can be removed from the mount surface 48 of the mechanical structure.

FIG. 2 shows a similar background structure, with the bearing block 12 secured to the mount surface 48 with attachment bolts 58. The bolts 58 are threaded into threaded inserts 44 which are secured in block holes 46. Likewise to remove this bearing block 12 from the mechanical structure or mount surface 48, one must first remove the set screws 24 and then the attachment bolts 58 are removed from the block holes 46 threaded inserts 44. The mechanical structure can then be cleaned or the bearing block 12 can be replaced.

FIG. 3 shows the applicant's embodiments of the bearing block 12. In this embodiment, the shaft 22 has a shaft hole 33 and is secured to the shoulder 36 of the inner race 18 with a shaft lock 34. The shaft lock 34 is a quick release spring pin. The shaft lock 34 is inserted into a hole in the shoulder 18 into a co-linear shaft hole 33 and exits the inner race 18 from a co-linear hole on the opposite side of inner race 18. The ball 32 is biased via a spring (not shown), away from the outer surface of the pin and withdraws into the shaft lock 34 when the shaft lock 34 is pulled perpendicular to the shaft 22 thereby allowing disassembly of the bearing block 12 from the shaft 22 without any tools.

FIG. 4 shows one embodiment of the mount surface 48. In this embodiment, two spring pins 30 are secured in the mount surface 48 by welding or other methods. The pins 30 have a vertex 68 defined as the top of the pins 30, see FIGS. 4, 5. These pins 30 have spring loaded balls 32 for insertion into the block holes 46 in the surface 38 of the mount block 14. In FIG. 3 is shown the top of the block hole 46 having a blind end 70 and an open end 72 at the bottom. Each block hole 46 has a sleeve 16 which is an open ended cylinder and which is press fit or molded into the block hole 46 or can be secured with adhesive. The sleeves 16 have an open top end 15 and open bottom end 17. The bottom end 17 of the sleeves 16 is co-planar with surface 38, or the bottom end 17 does not extend beyond the plane of surface 38. At the bottom end 17 of the sleeves 16 is a taper 28. The sleeves 16 are sized such that when they are inserted into the block holes 46, there is a block cavity 26 between the top end 15 of the sleeve 16 and the blind end 70 of the block hole 46, best seen FIG. 3. This cavity 26 is sized such that the ball 32 on the spring pins 30 resides in the cavity 26 thereby securing the mount block 14 to the mount surface 48. When the ball 32 is inserted beyond the end of the sleeve 16, the spring in the pin forces the ball further from the spring pin 30 outer surface. The ball 32 resists movement of the spring pin 30 from the sleeve 16 in the block hole 46.

This allows the mount block 14 to be removed from the mount surface 48 by providing a force to the bearing block 12 such that the ball 32 compresses into the spring pin 30. The ball 32 can then slide into the sleeve 16 and bearing block 12 can be removed from the mount surface 48. No tools are thus required to remove the mount block 14 from the mount surface 48.

FIG. 5 shows an alternative embodiment of the mount surface 48 with threaded spring pins 30 affixed. The spring pins 30 can be welded to the mount surface 48 or the spring pins 30 could be threaded into the mount surface 48. This would thus allow the use of the spring pins 30 and mount block 14 to be used to retro fit an existing system that has an existing fixture and holes. Standard mount blocks 14 as seen in FIGS. 1 & 2 could thereby be replaced by a mount block 14 shown in FIG. 3, with the corresponding mount surfaces 48 shown in FIG. 4 or 5.

FIG. 6 shows a side view of one embodiment of the applicants bearing block 12 where the attachment of the shaft lock 34 can more clearly be seen affixed through the shoulder 36 and shaft 22. The spring pin 30 can also be more clearly seen housed within the block hole 46 having a sleeve 16 where the ball 32 is located between the end of the sleeve 16 and the end of the block hole 46 or within the cavity 26.

One can appreciate the ease at which bearing block 12 can be removed from the shaft 22 and the mount block 14 from the fixture 64. The user can pull on the mount block 14 compressing the balls 32 into the spring pin 30, the ball 32 slides into the sleeve 16 and the mount block 14 is removed from the spring pins 30. The user can then grasp the tab 35 of the shaft lock 34 and pull, whereby the ball 32 compresses into the outer surface of the shaft lock 34, into the shoulder 36 of the inner race 18, through the shaft 22, into the other side of the shoulder 36 of the inner race 18 to be removed. This thus frees the shaft 22 from being secured to the bearing block 12. The shaft 22 can be removed from the bearing block 12. The bearing block 12 can be replaced or sterilized as needed. No tools are necessary to remove this bearing block 12 from the shaft 22 and the fixture 64 and likewise no tools would be necessary to replace or reassemble it.

It will now be apparent to those skilled in the art that other embodiments, improvements, details and uses can be made consistent with the letter and spirit of the foregoing disclosure and within the scope of this application, which is limited only by the following claims, construed in accordance with the patent law, including the doctrine of equivalents.

The invention claimed is:
1. A bearing block attachable and removable from a shaft having a hole with a spring pin and attachable and removable from a mount surface having spring pins, the bearing block comprising:
   a mount block having an inner race, an outer race and balls there between, the inner race extending from the mount block in a shoulder, the shoulder having an outer end and two co-linear holes there through near the outer end;

the mount block having a surface, the surface having at least two block holes, the block holes each containing a sleeve, the sleeve is shorter than the depth of the block holes;

whereby the spring pin is inserted into the shoulder holes and the shaft hole thereby securing the mount block to the shaft and the block holes are inserted over the spring pins on the mount surface securing the bearing block to the mount surface.

2. The sleeve of claim 1 wherein:
the bottom end of the sleeve is co-planar with the surface of the mount block.

3. The block holes of claim 1 further including:
a block cavity between the top end of the sleeve and a blind end of the block hole.

4. A bearing block assembly for mounting a rotatable shaft to a mount surface, the shaft having a hole, the bearing block assembly comprising:

a mount block having an inner race, an outer race and balls there between, the inner race extending from the mount block in a shoulder, the shoulder having an outer end, the shoulder having two co-linear holes there through near the outer end;

the mount block having a surface, the surface having at least two block holes, the block holes each containing a sleeve whereby the sleeve is shorter than the block holes and one end of each sleeve is co-planar with the mount surface;

at least two spring pins affixed to the mount surface, the spring pins aligned with the block holes of the mount block for affixing said mount block to said spring pins of the mount surface, the spring pins having a vertex;

a shaft lock, the shaft lock having a tab on one end and a ball on the opposite end;

whereby the shaft lock is inserted into the holes in the shoulder and the hole of the shaft thereby securing the shoulder of the mount block to the shaft.

5. The sleeve of claim 4 wherein:
the bottom end of the sleeve is co-planar with the surface of the mount block.

6. The block holes of claim 4 further including:
a block cavity between the top end of the sleeve and a terminus blind end of the block hole.

7. The spring pins of claim 4 further including:
a ball located near the vertex.

8. A device for securing a rotatable shaft with a hole to a mount surface, the device comprising:

a bearing block, the bearing block having a mount block, the mount block housing an inner race, an outer race and balls there between, the inner race having a shoulder, the shoulder having an outer end extending from the mount block, two co-linear holes approximately perpendicular to the shoulder and located near the outer end of the shoulder;

the bearing block having a surface, the surface having at least two block holes therein, each block hole housing a cylindrical sleeve, each sleeve having one a bottom end co-planar with the surface and the top end of the sleeve terminating a pre-determined distance from a terminus blind end of the block hole forming a block cavity;

the mount surface having spring pins affixed, the spring pins each having a vertex, said spring pins corresponding in number and location to the number of block holes in the bearing block, the spring pins spaced such that one spring pin can be inserted into a corresponding block hole;

a shaft lock, the shaft lock having a tab on one end and a ball on the opposite end;

whereby the shaft is inserted into the bearing block and the ball of the shaft lock inserted into the shoulder and the shaft hole thereby securing the bearing block to the shaft and the mount surface spring pins are inserted into the bearing block holes thereby securing the bearing block to the mount surface.

9. The mount surface spring pins of claim 8 further including:
a ball near the vertex of each spring pin.

* * * * *